US012642288B2

(12) United States Patent
Li et al.

(10) Patent No.: US 12,642,288 B2
(45) Date of Patent: Jun. 2, 2026

(54) NON-MEAT-DERIVED YEAST EXTRACTS HAVING RICH MEAT FLAVOR AND PREPARATION METHOD THEREFOR

(71) Applicant: ANGEL YEAST CO., LTD, Yichang (CN)

(72) Inventors: Pei Li, Yichang (CN); Qi Yuan, Yichang (CN); Xianwu Qin, Yichang (CN); Ku Li, Yichang (CN); Guanqun Tang, Yichang (CN); Jian Xiong, Yichang (CN); Wei Li, Yichang (CN)

(73) Assignee: ANGEL YEAST CO., LTD, Yichang (CN)

( * ) Notice: Subject to any disclaimer, the term of this patent is extended or adjusted under 35 U.S.C. 154(b) by 404 days.

(21) Appl. No.: 18/268,305

(22) PCT Filed: Dec. 10, 2021

(86) PCT No.: PCT/CN2021/137250
§ 371 (c)(1),
(2) Date: Jun. 19, 2023

(87) PCT Pub. No.: WO2022/135189
PCT Pub. Date: Jun. 30, 2022

(65) Prior Publication Data
US 2024/0074474 A1     Mar. 7, 2024

(30) Foreign Application Priority Data

Dec. 23, 2020    (CN) ......................... 202011539545.1

(51) Int. Cl.
| | |
|---|---|
| *A23L 27/26* | (2016.01) |
| *A23L 27/21* | (2016.01) |
| *A23L 31/15* | (2016.01) |
| *A23L 33/115* | (2016.01) |
| *A23L 33/145* | (2016.01) |
| *A23L 33/15* | (2016.01) |

(52) U.S. Cl.
CPC ............. *A23L 27/26* (2016.08); *A23L 27/215* (2016.08); *A23L 31/15* (2016.08); *A23L 33/115* (2016.08); *A23L 33/145* (2016.08); *A23L 33/15* (2016.08)

(58) Field of Classification Search
None
See application file for complete search history.

(56) References Cited

U.S. PATENT DOCUMENTS 3,930,046 A * 12/1975 Baugher ............... A23L 27/215
426/533

FOREIGN PATENT DOCUMENTS

| | | | |
|---|---|---|---|
| CN | 101744212 A | * | 6/2010 |
| CN | 102048117 A | * | 5/2011 |
| CN | 102058086 A | | 5/2011 |
| CN | 111631380 A | | 9/2020 |
| JP | 2005015683 A | * | 1/2005 |
| JP | 2010-63364 A | | 3/2010 |
| KR | 20160085062 A | | 7/2016 |
| WO | WO 2010060316 A1 | | 6/2010 |
| WO | WO 2013140901 A1 | | 8/2015 |

OTHER PUBLICATIONS

Chinese Patent Application No. 202011539545.1, English translation of first Office Action dated Nov. 22, 2022, 7 pages.
Chinese Patent Application No. 202011539545.1, English translation of second Office Action dated May 17, 2023, 9 pages.
Chinese Patent Application No. 202011539545.1, English translation of Rejection Decision dated Aug. 6, 2023, 13 pages.
PCT/CN2021/137250 English translation of Written Opinion of the International Searching Authority dated Feb. 25, 2022, 4 pages.
Chen Ze-Sheng, Study of Process Control of Gummy Production, Modern Food Science and Technology (2008) 24(4), pp. 369-371,374.
European Patent Application No. 21909186.5, European Search Report dated Jul. 25, 2024, 3 pages.
European Patent Application No. 21909186.5, European Search Opinion dated Jul. 25, 2024, 5 pages.

* cited by examiner

*Primary Examiner* — Jyoti Chawla
(74) *Attorney, Agent, or Firm* — Cozen O'Connor

(57) ABSTRACT

Non-meat-derived yeast extracts having rich meat flavor, and a preparation method therefor. The method includes: (1) mixing a yeast extract, vitamins, amino acids and water, and adding reducing sugar as needed; (2) adjusting the pH of a mixture obtained in step (1) at 4.0-8.0 with a pH regulator, and stirring the mixture to react at a temperature of 80-130° C. for 30-180 min to obtain a thermal-heated product; (3) adding vegetable oil into the thermal-heated product, and adding edible salt as needed to obtain a material to be dried; and (4) performing vacuum drying on the material to be dried obtained in step (3), and crushing the dried material. According to the present invention, the yeast extract is taken as a main raw material of a Maillard reaction, and a small amount of vitamins, amino acids and reducing sugar are added, so that the formula is simple. The yeast extracts with different rich meat flavor characteristics are obtained via the design of different formulas and process conditions, which better meets the demands of different food fields.

5 Claims, No Drawings

NON-MEAT-DERIVED YEAST EXTRACTS HAVING RICH MEAT FLAVOR AND PREPARATION METHOD THEREFOR

TECHNICAL FIELD

The present invention relates to the field of food additives, in particular to non-meat-derived yeast extracts having rich meat flavor, and a preparation method therefor.

BACKGROUND ART

Yeast extracts are concentrates of soluble nutrients and flavor substances that can be directly absorbed by the human body by degrading proteins in yeast cells into amino acids and peptides, degrading nucleic acids into nucleotides, and extracting them from the yeast cells along with other active ingredients such as B vitamins and trace elements. As a food ingredient, the yeast extracts have three major functions of seasoning, nutrition and health care, and have been widely used in instant noodles, meat products, condiments and other industries.

Vegetarianism is a kind of food culture, which shows the cultural concept of returning to nature, returning to health and protecting the ecological environment of the earth. The quietly spreading vegetarian culture has made vegetarianism increasingly a global fashion label. Vegetarianism has become a new environmentally friendly and healthy life-style. Yeast extracts have the aroma of broth, and therefore, the market demand for naturally high nutrient flavored yeast extracts is constantly increasing with the development of the food industry. Although the research on flavoring of the yeast extracts has been reported, the research on character-istic meat savory flavor is not in-depth. The existing research in the thermal reaction flavoring of the yeast extracts focuses on a thermal reaction between hydrolyzed animal proteins and the yeast extracts to generate characteristic meat savory flavor, and there are few reports on the use of other bulk raw materials for the thermal reaction.

The current general drying method for yeast extract products is spray drying, and some manufacturers use extru-sion drying when producing flavor-based yeast extracts, where a reaction of extrusion is carried out at a high temperature of 130° C. or above with a strong burnt (or burning) smell; and the spray drying also has a certain impact on the product flavor due to the higher drying temperature.

SUMMARY OF THE INVENTION

The problem existing in the prior art: non-meat-derived yeast extracts having rich flavor prepared in absence of yeast extracts.

In view of the deficiencies in the prior art, one of the purposes of the present invention is to provide a preparation method for non-meat-derived yeast extracts having rich meat flavor, the second purpose of the present invention is to provide non-meat-derived yeast extracts having rich meat flavor prepared by the above preparation method, and the third purpose of the present invention is to provide use of the non-meat-derived yeast extracts having rich meat flavor in food.

The technical solution adopted by the present invention to solve the technical problem is as follows.

A preparation method for non-meat-derived yeast extracts having rich meat flavor includes the following steps:

(1) mixing a yeast extract, vitamins, amino acids and water, and adding reducing sugar as needed; (2) adjust-ing the pH of a mixture obtained in step (1) at 4.0-8.0 with a pH regulator, and stirring the mixture to react at a temperature of 80-130° C. for 30-180 min to obtain a thermal-heated product; (3) adding vegetable oil into the thermal-heated product, and adding edible salt as needed to obtain a material to be dried; and (4) per-forming vacuum drying on the material to be dried obtained in step (3), and crushing the dried material.

Preferably, the amounts of the yeast extract, the water, the edible salt, the vegetable oil and the like are as follows in parts by weight: 40-90 parts of the yeast extract, 1-4 parts of the vitamins, 2-8 parts of the amino acids, 0-10 parts of the reducing sugar, 5-40 parts of the water, 0-30 parts of the edible salt, and 0.1-2 parts of the vegetable oil. Further preferably, the amounts of the yeast extract, the water, the edible salt, the vegetable oil and the like are as follows in parts by weight: 40-60 parts of the yeast extract, 1-4 parts of the vitamins, 2-8 parts of the amino acids, 5-10 parts of the reducing sugar, 10-40 parts of the water, 10-30 parts of the edible salt, and 0.1-2 parts of the vegetable oil.

Preferably, the yeast extract is one or a combination of two or more selected from the group consisting of GU03, KA301, LA00, DLA000, and FYLU48, more preferably GU03.

Preferably, the vegetable oil is palm oil and/or sunflower seed oil.

Preferably, the vitamins include vitamin B1 and/or vita-min C.

Preferably, the amino acids include one or a combination of two or more selected from the group consisting of L-cysteine, glycine, and methionine.

Preferably, the reducing sugar is xylose and/or glucose.

Preferably, the process conditions of the vacuum drying are a drying temperature of 80-130° C., a vacuum degree of 0.05-0.1 MPa, and a drying time of 30-180 min.

Preferably, the pH regulator is one or a combination of two or more selected from the group consisting of citric acid, malic acid, tartaric acid, lactic acid, sodium hydroxide, and potassium hydroxide.

The present invention further provides non-meat-derived yeast extracts having rich meat flavor prepared by the above preparation method.

The present invention also further provides use of the non-meat-derived yeast extracts having rich meat flavor in food.

The present invention has the beneficial effects that according to the present invention, the yeast extract is taken as a main raw material of a Maillard reaction, and a small amount of vitamins, amino acids and reducing sugar are added, so that the formula is simple. The yeast extracts with different rich meat flavor characteristics (for example, chicken, pork, beef and other flavors) are obtained via the design of different formulas and process conditions, which better meets the demands of different food fields. By adopt-ing the vacuum drying method, the characteristic aroma generated by a thermal reaction is better preserved; and the vegetable oil is added to the material to be dried, so that the dust generated in the drying process is greatly reduced.

DETAILED DESCRIPTION OF THE INVENTION

One of the objectives of the present invention is to provide a preparation method for non-meat-derived yeast extracts having rich meat flavor.

Specifically, the preparation method for the non-meat-derived yeast extracts having rich meat flavor includes the following steps: (1) weighing a yeast extract, vitamins, amino acids and water, then adding same into a mixing tank for mixing, adding reducing sugar into the mixing tank as needed, and then putting the obtained mixture into a thermal reaction tank; (2) adding a pH regulator into the thermal reaction tank to adjust the pH to 4.0-8.0, heating up to 80-130° C., and stirring the mixture to react for 30-180 min to obtain a thermal-heated product; (3) adding vegetable oil into the thermal-heated product, adding edible salt as needed, and stirring and mixing well to obtain a material to be dried; and (4) drying the material to be dried obtained in step (3) in vacuum drying equipment, and crushing the dried material by using a pulverizer, and then sieving to obtain powdered products with different degrees of fineness.

Specifically, the addition of the reducing sugar can be selected according to the flavor; and for example, when a strong chicken flavor is required, the reducing sugar may not be added.

Preferably, the amounts of the yeast extract, the water, the edible salt, the vegetable oil and the like are as follows in parts by weight: 40-90 parts of the yeast extract, 1-4 parts of the vitamins, 2-8 parts of the amino acids, 0-10 parts of the reducing sugar, 5-40 parts of the water, 0-30 parts of the edible salt, and 0.1-2 parts of the vegetable oil. Further preferably, the amounts of the yeast extract, the water, the edible salt, the vegetable oil and the like are as follows in parts by weight: 40-60 parts of the yeast extract, 1-4 parts of the vitamins, 2-8 parts of the amino acids, 5-10 parts of the reducing sugar, 10-40 parts of the water, 10-30 parts of the edible salt, and 0.1-2 parts of the vegetable oil.

Preferably, the yeast extract is one or a combination of two or more selected from the group consisting of GU03, KA301, LA00, DLA000, and FYLU48, more preferably GU03, where the GU03, the KA301, the LA00, the DLA000 and the FYLU48 are yeast extract series products of Angel Yeast Co., Ltd.

Preferably, the vegetable oil is palm oil and/or sunflower seed oil.

Preferably, the vitamins include vitamin B1 and/or vitamin C.

Preferably, the amino acids include one or a combination of two or more selected from the group consisting of L-cysteine, glycine, and methionine.

Preferably, the reducing sugar is xylose and/or glucose.

Preferably, the process conditions of the vacuum drying are a drying temperature of 80-130° C., a vacuum degree of 0.05-0.1 MPa, and a drying time of 30-180 min.

Preferably, the pH regulator is one or a combination of two or more selected from the group consisting of citric acid, malic acid, tartaric acid, lactic acid, sodium hydroxide, and potassium hydroxide.

The present invention further provides non-meat-derived yeast extracts having rich meat flavor prepared by the above preparation method.

The present invention also further provides use of the non-meat-derived yeast extracts having rich meat flavor in food.

In the following examples, the sensory evaluation method was as follows: 1 g of each of the prepared non-meat-derived yeast extracts having rich meat flavor was weighed and then dissolved with 100 mL of hot water, 20 professional sensory evaluators were randomly invited, and single-person evaluation rooms were set up according to the requirements of GB/T13868-2009. The evaluators qualitatively described samples with serial numbers through descriptive sensory analysis; and specifically, the appearances and colors of the samples were first observed, and then the samples were smelled and tasted.

The sources and manufacturers of all components of the non-meat-derived yeast extracts having rich meat flavor provided by the present invention are shown in Table 1.

TABLE 1

| Sources of raw materials and equipment used in the present invention | | |
|---|---|---|
| Component | Type | Source or manufacturer |
| Yeast extract | GU03 | Angel Yeast Co., Ltd. |
| Yeast extract | DLA000 | Angel Yeast Co., Ltd. |
| Yeast extract | LA00 | Angel Yeast Co., Ltd. |
| Yeast extract | KA301 | Angel Yeast Co., Ltd. |
| Yeast extract | FYLU48 | Angel Yeast Co., Ltd. |
| L-cysteine | Food grade | Hebei Huayang Biotechnology Co., Ltd. |
| Glycine | Food grade | Hebei Huayang Biotechnology Co., Ltd. |
| Methionine | Food grade | CJ HAIDE(NINGBO) BIOTECH CO., LTD. |
| Xylose | Food grade | Zhejiang Huakang Pharmaceutical Co., Ltd. |
| Glucose | Food grade | Liaoning Yihai Jialidierlesi Starch Technology Co., Ltd. |
| Vitamin B1 | Food grade | Jiangxi Tianxin Pharmaceutical Co., Ltd. |
| Vitamin C | Food grade | Shandong Tianli Pharmaceutical Co., Ltd. |
| Palm oil | Food grade | Yihai Kerry Arawana Holdings Co, Ltd. |
| Sunflower seed oil | Food grade | Shandong Scents Grains&Oil Co., Ltd. |
| Citric acid | Food grade | Shandong Lemon Biochemical Co., Ltd. |
| Lactic acid | Food grade | Henan Jindan Lactic Acid Technology Co., Ltd. |
| Malic acid | Food grade | Anhui Sealong Biotechnology Co., Ltd. |
| Tartaric acid | Food grade | Hangzhou Regin Bio-tech Co., Ltd. |
| Sodium hydroxide | Food grade | Xinjiang Zhongtai Chenical Co., Ltd. |
| Potassium hydroxide | Food grade | Lianyungang Kexin Chemical Co., Ltd. |
| Edible salt | Non-iodized salt, food grade | Hunan Salt Industry Co., Ltd. |
| Vacuum drying equipment | CVD | Wenzhou Jinbang Light Industry Machinery Co., Ltd. |

The preparation process parameters of the non-meat-derived yeast extracts having rich meat flavor in examples are detailed in Table 2.

TABLE 2

Preparation process parameters of the non-meat-derived yeast extracts having rich meat flavor provided by the present invention

| Process parameter | | Example 1 | Example 2 | Example 3 | Example 4 | Example 5 | Example 6 | Example 7 | Example 8 | Example 9 |
|---|---|---|---|---|---|---|---|---|---|---|
| Addition amount of GU03 (g) | | 74 | 46 | 40 | 40 | 25 | 35 | 65 | 30 | 70 |
| Addition amount of DLA000 (g) | | 0 | 0 | 0 | 0 | 10 | 0 | 0 | 10 | 0 |
| Addition amount of LA00 (g) | | 0 | 0 | 0 | 10 | 0 | 12 | 0 | 0 | 0 |
| Addition amount of KA301 (g) | | 0 | 0 | 0 | 0 | 5 | 10 | 12 | 0 | 20 |
| Addition amount of FYLU48 (g) | | 0 | 0 | 0 | 10 | 5 | 8 | 8 | 0 | 0 |
| Addition amount of vitamin B1 (g) | | 3 | 0 | 1 | 1 | 1.5 | 0.5 | 1.5 | 2 | 0 |
| Addition amount of vitamin C (g) | | 0 | 1.5 | 0 | 0 | 0.5 | 0.8 | 0 | 2 | 1 |
| Addition amount of L-cysteine, g | | 2 | 2 | 2 | 3 | 1 | 2.5 | 2.4 | 4 | 0.5 |
| Addition amount of glycine (g) | | 2 | 0 | 2 | 0 | 1 | 1.5 | 0 | 2 | 1.5 |
| Addition amount of methionine (g) | | 0 | 0 | 2 | 1.5 | 1 | 2 | 0 | 2 | 0 |
| Addition amount of xylose, g | | 0 | 7 | 0 | 0 | 2 | 1.8 | 0 | 5 | 0 |
| Addition amount of glucose (g) | | 0 | 0 | 5 | 1.5 | 8 | 1.2 | 0 | 5 | 0 |
| Addition amount of water (g) | | 17 | 13 | 40 | 8 | 24 | 14 | 6 | 36.5 | 6.9 |
| Addition amount of salt (g) | | 0 | 30 | 6.3 | 24.25 | 15 | 10 | 5 | 0 | 0 |
| Addition amount of palm oil (g) | | 2 | 0 | 0.7 | 0 | 0 | 0.2 | 0.1 | 1.5 | 0 |
| Addition amount of sunflower seed oil (g) | | 0 | 0.5 | 1 | 0.75 | 1 | 0.5 | 0 | 0 | 0.1 |
| Thermal reaction | Temperature (° C.) | 115 | 115 | 95 | 85 | 110 | 130 | 95 | 100 | 80 |
| | Time (min) | 40 | 60 | 120 | 150 | 50 | 30 | 100 | 65 | 180 |
| | pH | 5.5 | 6.5 | 4.0 | 4.5 | 6 | 5.5 | 7 | 7.5 | 8 |
| Vacuum drying | Temperature (° C.) | 110 | 125 | 100 | 95 | 130 | 105 | 115 | 100 | 80 |
| | Time (min) | 60 | 50 | 150 | 150 | 40 | 50 | 100 | 65 | 180 |
| | vacuum degree (MPa) | 0.09 | 0.08 | 0.1 | 0.095 | 0.08 | 0.07 | 0.1 | 0.06 | 0.05 |

Example 1

74 g of a yeast extract GU03, 2 g of L-cysteine, 2 g of glycine, 3 g of vitamin B1 and 17 g of water were weighed as shown in Example 1 of Table 2, and added into a mixing tank for mixing to obtain a mixture. Then, the mixture was put into a thermal reaction tank, the pH of the mixture was adjusted to 5.5 with citric acid, and the mixture was thermally reacted at 115° C. for 40 min, so that a thermal-heated product was obtained. After that, 2 g of palm oil was added to the above thermal-heated product to obtain a material to be dried. Finally, the above material to be dried was placed in vacuum drying equipment and dried for 60 min at 110° C. under the condition that the vacuum degree is 0.09 Mpa, and the dried material was pulverized to obtain a powdered non-meat-derived yeast extract 1 having rich meat flavor.

The non-meat-derived yeast extract 1 having rich meat flavor prepared in the Example 1 was yellow in color, and after the evaluation of the sensory evaluators, the product was very delicious in taste, with rich chicken flavor.

Example 2

46 g of a yeast extract GU03, 2 g of L-cysteine, 1.5 g of vitamin C, 7 g of xylose and 13 g of water were weighed as shown in Example 2 of Table 2, and added into a mixing tank for mixing to obtain a mixture. Then, the mixture was put into a thermal reaction tank, the pH of the mixture was adjusted to 6.5 with sodium hydroxide, and the mixture was thermally reacted at 115° C. for 60 min, so that a thermal-heated product was obtained. After that, 30 g of edible salt and 0.5 g of sunflower seed oil were added to the above thermal-heated product to obtain a material to be dried. Finally, the above material to be dried was placed in vacuum drying equipment and dried for 50 min at 125° C. under the condition that the vacuum degree is 0.08 Mpa, and the dried material was pulverized to obtain a powdered non-meat-derived yeast extract 2 having rich meat flavor.

The non-meat-derived yeast extract 2 having rich meat flavor prepared in the Example 2 was brown in color, and after the evaluation of the sensory evaluators, the product was very delicious in taste, with rich beef flavor.

Examples 3-9

On the basis of the process conditions listed in Examples 3-9 in Table 2, the operations of Examples 3-9 were carried out according to steps which are the same as those in Example 2 so as to obtain powdered non-meat-derived yeast extracts 3-9 having rich meat flavor.

The pH regulators used in Examples 3-9 and the sensory evaluation results of the non-meat-derived yeast extracts having rich meat flavor prepared in Examples 3-9 are as shown in Table 3.

TABLE 3

Evaluation results of Examples 3-9

| | Example 3 | Example 4 | Example 5 | Example 6 | Example 7 | Example 8 | Example 9 |
|---|---|---|---|---|---|---|---|
| pH regulator | Malic acid | Tartaric acid | Sodium hydroxide | Lactic acid | Potassium hydroxide | Sodium hydroxide | Potassium hydroxide |
| Color | Yellow | Golden yellow | Light brown | Pale yellow | Pale yellow | Light brown | Golden yellow |
| Evaluation results | The product is very delicious in taste, with rich pork flavor. | The product is very delicious in taste, with rich pork flavor. | The product is very delicious in taste, with rich beef flavor. | The product is very delicious in taste, with rich pork flavor. | The product is very delicious in taste, with rich chicken flavor. | The product is very delicious in taste, with rich beef flavor. | The product is very delicious in taste, with rich chicken flavor. |

Experimental Example 1

The non-meat-derived yeast extract 1 having rich meat flavor prepared in Example 1 of the present invention was used as a raw material to make chicken topping, then the chicken topping was added to the potato chips, and the potato chips with chicken topping and potato chips without chicken topping were subjected to sensory evaluation analysis, where the addition amount of the topping was 7% by weight of potato chips.

A preparation method for the topping added with the non-meat-derived yeast extract having rich meat flavor prepared in Example 1 was as follows: 28 g of monosodium glutamate, 25 g of edible salt, 15 g of white sugar, 12 g of starch, 3 g of shallot powder, 2 g of onion powder, 2 g of soy sauce powder, 2 g of glucose, 2 g of an anticaking agent, 1 g of white pepper powder, 1 g of garlic powder and 7 g of the non-meat-derived yeast extract 1 having rich meat flavor were mixed well to obtain a sample numbered as C-1; and the above non-meat-derived yeast extract 1 having rich meat flavor was replaced with maltodextrin to obtain topping without the non-meat-derived yeast extract having rich meat flavor, which was used as a sample numbered as C-2.

Experimental Example 2

The non-meat-derived yeast extract 2 having rich meat flavor prepared in Example 2 of the present invention was added to hand-shredded vegetarian meat, and a preparation method therefor was as follows: 100 g of vegetarian meat embryo, 15 g of water, 15 g of chili oil, 3 g of white granulated sugar, 1 g of light soy sauce, 1.2 g of salt, 1 g of carrageenan, 1 g of chili powder, 1 g of pepper powder, 0.3 g of garlic powder, 0.3 g of ginger powder, 0.8 g of the non-meat-derived yeast extract 2 having rich meat flavor, and 0.4 g monosodium glutamate were mixed well to obtain a sample numbered as C-3; and the above non-meat-derived yeast extract 2 having rich meat flavor was replaced with maltodextrin to obtain hand-shredded vegetarian meat without the non-meat-derived yeast extract having rich meat flavor, which was used as a sample numbered as C-4.

Experimental Example 3

The non-meat-derived yeast extract 3 having rich meat flavor prepared in Example 3 of the present invention was added to soup bases, and a preparation method therefor was as follows: 40 g of edible salt, 16 g of maltodextrin, 14 g of monosodium glutamate, 13.5 g of white sugar, 3.8 g of garlic powder, 2.2 g of white pepper, 1 g of black pepper, 2 g of chili powder, 1 g of disodium 5'-ribonucleotide, 0.5 g of xanthan gum and 6 g of the non-meat-derived yeast extract 3 having rich meat flavor were mixed well to obtain a sample numbered as C-5; the above non-meat-derived yeast extract 3 having rich meat flavor was replaced with maltodextrin to obtain soup bases without the non-meat-derived yeast extract having rich meat flavor, which was used as a sample numbered as C-6; and then, 1 g of each of the soup bases C-5 and C-6 was weighed, dissolved in 100 mL of hot water, and subjected to sensory evaluation.

20 professional sensory evaluators were randomly invited, and single-person evaluation rooms were set up according to the requirements of GB/T13868-2009. The evaluators qualitatively described the smell and taste of the numbered samples obtained in Experimental Examples 1-3 through descriptive sensory analysis. The experimental results are shown in Table 4.

TABLE 4

| | C-1 | C-2 | C-3 | C-4 | C-5 | C-6 |
|---|---|---|---|---|---|---|
| Experimental results of Experimental Examples 1-3 | | | | | | |
| Smell | Rich in chicken flavor | Not savory | Rich in beef flavor and pure in meat flavor | Not savory, with bean flavor | Rich in pork flavor | Not savory |
| Taste | Delicious and pure in taste | Thin in umami flavor and not mellow enough | Pure in taste, having meaty taste, less in beany taste | Beany in taste and not mellow enough | Coordinated in taste, full and rich, with a good aftertaste | Thin in taste and not mellow enough |

It can be seen from experiments that adding the non-meat-derived yeast extracts having rich meat flavor prepared by the present invention to foods such as the potato chips, the hand-shredded vegetarian meat, and the soup bases can increase the rich meat flavor of the foods, resulting in a delicious and pure taste, and a better flavor.

The above descriptions are only exemplary embodiments of the present invention, and are not intended to limit the present invention in any form. Modifications, equivalent replacements and improvements made within the spirit and principle of the present invention shall be included in the protection scope of the present invention.

The invention claimed is:

1. A preparation method for non-meat-derived yeast extracts having beef flavor, comprising:
   (1) mixing a yeast extract, vitamins, amino acids and water, and adding reducing sugar as needed;
   (2) adjusting the pH of the mixture obtained in step (1) to 4.0-8.0 with a pH regulator, and stirring the mixture to react at a temperature of 80-130° C. for 30-180 min to obtain a thermal-heated product;
   (3) adding vegetable oil into the thermal-heated product, and adding edible salt as needed to obtain a material to be dried; and
   (4) performing vacuum drying on the material to be dried obtained in step (3), and crushing the dried material, wherein, the yeast extract is 40-46 parts by weight, the vitamins is 1.5-4 parts by weight, the amino acids is 2-8 parts by weight, the reducing sugar is 7-10 parts by weight, the water is 13-40 parts by weight, the edible salt is 0-30 parts by weight, the vegetable oil is 0.1-2 parts by weight; the vegetable oil is palm oil and/or sunflower seed oil; the vitamins comprise vitamin B1 and/or vitamin C; the amino acids comprise one or a combination of two or more selected from the group consisting of L-cysteine, glycine, and methionine; the reducing sugar is xylose and/or glucose.

2. The preparation method according to claim 1, wherein the edible salt is 10-30 parts of by weight.

3. The preparation method according to claim 1, wherein the process conditions of the vacuum drying are a drying temperature of 80-130° C., a vacuum degree of 0.05-0.1 MPa, and a drying time of 30-180 min.

4. The preparation method according to claim 1, wherein the pH regulator is one or a combination of two or more selected from the group consisting of citric acid, malic acid, tartaric acid, lactic acid, sodium hydroxide, and potassium hydroxide.

5. Non-meat-derived yeast extracts having rich meat flavor prepared by the preparation method according to claim 1.

* * * * *